June 1, 1965  B. W. O. DICKINSON III  3,186,216
METHOD AND APPARATUS FOR GENERATING AND RECEIVING
ULTRASONIC HELICAL WAVES
Filed Nov. 9, 1961  4 Sheets-Sheet 1

INVENTOR.
Ben Wade Oakes Dickinson III
BY
Attorneys

June 1, 1965  B. W. O. DICKINSON III  3,186,216
METHOD AND APPARATUS FOR GENERATING AND RECEIVING
ULTRASONIC HELICAL WAVES
Filed Nov. 9, 1961  4 Sheets-Sheet 4

INVENTOR.
Ben Wade Oakes Dickinson III
BY
Attorneys

United States Patent Office 3,186,216
Patented June 1, 1965

3,186,216
METHOD AND APPARATUS FOR GENERATING AND RECEIVING ULTRASONIC HELICAL WAVES
Ben Wade Oakes Dickinson III, 3290 Jackson St., San Francisco, Calif.
Filed Nov. 9, 1961, Ser. No. 151,331
6 Claims. (Cl. 73—67.5)

This invention relates to a method and apparatus for generating and receiving ultrasonic helical waves and more particularly to a method and apparatus for generating and receiving ultrasonic helical waves for use in the non-destructive testing of tubular objects.

At the present time there is a great need for an on-stream tester to assess the existence and degree of change of mechanical integrity from an original condition of an assembled fluid system in operation. There is particularly a requirement for such inspection in steam power plants, chemical plants and refineries, military and missile facilities, and nuclear plants. Also, at the present time, there exists an immediate and pressing need for a line pipe testing apparatus which is particularly applicable to large diameter longitudinally welded line pipe and high pressure seamless pipe principally used for oil and gas transmission lines. In an attempt to solve the problem of testing line pipe, ultrasonic waves have been introduced into the line pipe by placing a vibrating crystal in direct contact with the outer side walls of the pipe. Vibrations of the crystal are transmitted and coupled to the pipe wall by direct contact with the pipe wall or by an uninterrupted liquid path between the crystal face and the pipe wall. This particular technique requires that the ultrasonic waves from the transducer pass around the pipe wall in a generally circular path or bouncing at an oblique angle between the inner and outer pipe walls as disclosed in United States Patent No. 2,527,986. When a flaw which is substantially parallel to the longitudinal axis of the pipe occurs in the pipe wall and is encountered by the ultrasonic wave train, a reflection will occur at this discontinuity which will bounce or be reflected in the reverse direction to return to the transmitting crystal or to another receiving crystal to indicate that a reflecting surface has been encountered in the pipe wall to thereby indicate a flaw within the wall of the pipe. With such a method and apparatus, it is necessary that the entire length of the pipe be scanned by successive placement of the transducer. Such a method and apparatus has been found to be limited in its application because it has been found that for the ultrasonic energy to enter the pipe, either the pipe surface must be very smooth or some couplant like water must be supplied between the transducer and the pipe wall or both. Also, it is necessary that the flaw in the pipe have an orientation such that a reflected wave is returned to the transmitting transducer or a similarly positioned additional receiving transducer. There is, therefore, a continuing need for an improved method and apparatus which can be utilized for economically and rapidly inspecting tubular objects such as line pipe and for providing on-stream inspection.

In general, it is an object of the present invention to provide a method and apparatus for generating and receiving ultrasonic helical waves which are particularly adapted for the non-destructive testing of tubular bodies.

Another object of the invention is to provide a method and apparatus of the above character which can be utilized for on-stream inspection of the test bodies.

Another object of the invention is to provide a method and apparatus of the above character which makes possible complete inspection of the entire tubular body within a very short period of time.

Another object of the invention is to provide a method and apparatus of the above character in which a complete inspection can be made with a limited number of transducers.

Another object of the invention is to provide a method and apparatus of the above character which gives a direct indication of the presence of a flaw and of the coordinates of any flaw.

Another object of the invention is to provide a method and apparatus of the above character which makes possible go, no-go testing and which does not require operator interpretation.

Another object of the invention is to provide a method and apparatus of the above character in which a permanent record can be made of the test.

Another object of the invention is to provide a method and apparatus of the above character in which a signal may be received regardless of flaw shape or orientation but indicative of flaw size.

Another object of the invention is to provide a method and apparatus of the above character which makes possible a continuing positive test of an installed fluid system throughout its life.

Another object of the invention is to provide a method and apparatus of the above character in which either continuous wave or pulsed wave techniques can be used.

Another object of the invention is to provide a method and apparatus of the above character in which a combination of pulse-echo and through-transmission type techniques can be used.

Another object of the invention is to provide a method and apparatus of the above character in which the wave trains have controllable directivity.

Additional objects and features of my invention will appear from the following description in which the preferred embodiments are set forth in detail in conjunction with the accompanying drawings.

Referring to the drawings.

In general, my method for non-destructive testing of tubular objects or members consists of transmitting an ultrasonic wave into the tubular object at an angle differing from the longitudinal axis of the tubular object so that the wave travels in a helical path in the wall of the tubular member away from the point of introduction of the ultrasonic wave into the tubular member, and receiving the helical wave at a position spaced from the position at which the wave is introduced into the tubular object. The apparatus for introducing and receiving the helical waves includes devices hereinafter termed offsets which are secured to the tubular member to introduce the ultrasonic wave train into the tubular member at a predetermined orientation and to receive helical waves travelling only in a predetermined direction.

Figures 1, 2:
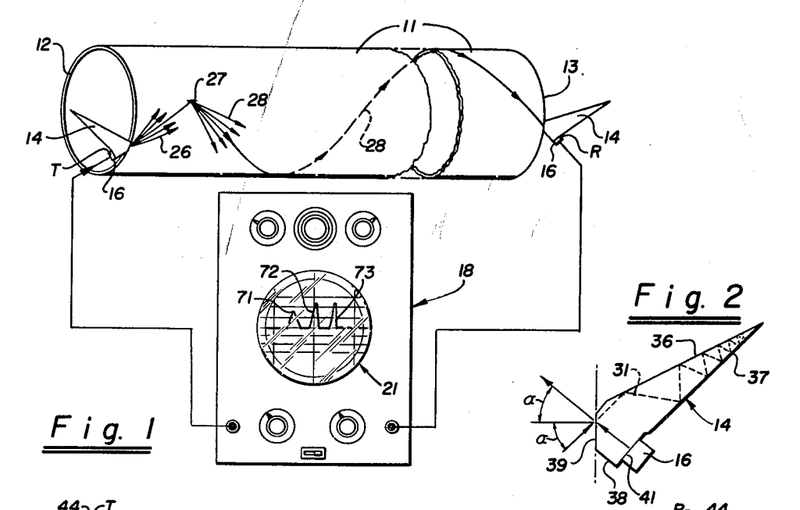
FIGURE 1 is a block diagram with certain parts schematically illustrated of apparatus incorporating my invention with which it is possible to determine whether there are flaws in a tubular member.
FIGURE 2 is an enlarged detail view of one of the transducer offsets utilized in FIGURE 1.

In FIGURE 1 of the drawings, I have shown apparatus incorporating my invention for performing my method for the non-destructive testing of tubular bodies or members. Thus, in FIGURE 1, I have shown a pipe 11 as, for example, a pipe having an outside diameter of 36 inches and a wall thickness of ⅝ of an inch. As shown, the pipe 11 is provided with relatively smooth ends 12 and 13 which are either squared or bevelled. An offset 14 is mounted on each end of the pipe and has a particular configuration as hereinafter described.

The offsets 14 are secured to the ends of the pipe in any suitable manner. For example, they can be welded to the ends of the pipe or they can be embedded into the ends of the pipe by the use of sufficient pressure. The primary purpose is to establish an intimate contact between the offset 14 and the end wall of the pipe so that there is a good transfer of ultrasonic energy from the offset 14 to the pipe 11 or vice versa. As herinafter described, detachable means can be provided for detachably securing the offsets 14 to the pipe.

An electroacoustic transducer 16 is mounted on each of the offsets 14 and may take any suitable form such as a Type Z transducer manufactured by Branson Instruments, Inc. of Stamford, Conn. As shown in the drawings, one of the transducers is identified as the transmit transducer T, whereas the other transducer is identified as the receive transducer R. The transmit transducer T is energized by pulses or waves from a suitable transmitting, receiving and display apparatus 18 of a conventional type such as the Model 5A Ultrasonic Sonoray manufactured by Branson Instruments, Inc. As is well known to those skilled in the art, such apparatus can produce pulses or continuous waves and can receive the same and display them on a cathode ray tube 21.

As hereinafter described, the offsets 14 are shaped in such a manner that the ultrasonic waves produced by the transmitting transducer 16 are introduced into the end of the pipe wall in a direction of propagation away from the transmit transducer 16 and the transmit offset 14. The application of pulses or a continuous wave from the apparatus 18 to the transducer 16 causes it to oscillate at its designed frequency. The face of the transducer 16 makes intimate contact with the offset 14 so that an ultrasonic wave train is introduced into the offset in a direction which is perpendicular to the face of the transducer 16 engaging the transmit offset 14.

As hereinafter described, the transmit offset 14 is shaped in such a manner so that the wave train is introduced in the end wall of the pipe at a predetermined orientation with respect to the longitudinal axis of the tubular body 11. However, the area of contact between the transmitting transducer offset 14 and the end of the pipe is sufficiently wide so that a substantially uncollimated angularly diverging group of ultrasonic wave trains enter the end of the pipe as shown by the multiplicity of arrows 26 emanating from the transmitting offset 14. These wave trains, as they emanate from the transmit offset 14, propagate in a direction which is away from the transmit offset 14 and follow a helical path around and longitudinally of the wall of the pipe toward the other end of the pipe. The ultrasonic wave train follows a helical path because from the point of view of the short wavelength helical ultrasonic wave train, the pipe represents a flat plane which is infinitely wide. This is supported by the fact that mathematically a helix can be defined as a straight line superimposed upon a cylindrical surface. The ultrasonic wave trains actually travel in a helical path because they are introduced into the end walls of the pipe at an angle which is different from the longitudinal axis of the tubular body or pipe 11.

Now let it be assumed that there is a flaw 27 in the pipe. As hereinafter described, this flaw can have any orientation and be at any point in the pipe. One of the rays 26 from the wave trains introduced by the transmiting offset 14 will impinge on or strike the flaw 27. Assuming that the flaw is not a smooth reflecting surface (which is the case with pipe flaws generally in the form of cracks, inclusions and porosites), and angularly diverging group of wave trains represented by the rays 28 will be reflected from this flaw at an oblique angle. I have found that the rougher the surface of the flaw, the more is the reflection and angular spreading which occurs. When the surface of the flaw is relatively smooth, the angle of reflection should equal the angle of incidence. The nature of the reflected wave thereby helps to indicate the surface of the flaw.

The reflected wave trains 28 set up a number of helices, the number of complete loops of the helices being determined by their angle with respect to the longitudinal axis of the pipe. One of the wave trains 28 is oriented in such a manner that after a partial, a complete loop or several complete helical loops around the pipe, it enters the receiving transducer offset 14 as shown and is detected by the receive transducer 16. The resulting signal is then received and amplified in the apparatus 18 and displayed on the oscilloscope 21.

Substantially the entire length and the entire wall of the pipe 11 can be inspected from the one position of the transmit transducer 16 because of the fact that a large number of wave trains which are angularly divergent are introduced into the pipe by the transmit transducer 16 through the offset 14 so that the helices defined by these ultrasonic wave trains cover substantially all portions of the wall of the tubular body or member 11. If there is no flaw in the pipe, the ultrasonic wave trains will travel in the same direction around and longitudinally of the pipe in a direction which is opposite hand to the direction in which the reflected waves 28 travel. When the unreflected waves 26 arrive at the receiving transducer offset 14, the unreflected waves enter the receiving transducer offset 14 in such a direction that they bounce progressively down the tapered portion of the offset as indicated by the dotted line shown in FIGURE 2 so that they become attenuated and are effectively lost. With this offset orientation, they do no excite the transducer 16, and thus when there is no flaw in the pipe, there will be no reflected signal in the oscilloscope 21. If, however, there is a reflected signal, this indicates that there is a flaw in the pipe because the receive transducer will be excited.

It should be pointed out that it is possible to get more than one pulse indication of a single flaw on the oscilloscope 21. Thus, with the reflected wave train 28 shown in FIGURE 1, the offset orientation is selected such that only one loop is made by the reflected wave before it enters the receive transducer 14. It is readily apparent that the angle of the helix could be such so that the reflected wave train could make two complete loops or three complete loops in the pipe before it enters the receive transducer offset 14. Such wave trains would also excite the receive transducer 16 and give an indication on the oscilloscope 21. However, such indications will be spaced in time from the other first indication given as shown in FIGURE 1. The maximum amplitude pulse is determined by orientation and shape of the offset 14. Two factors determine this pulse height. One is the angle at which the wave train enters the end of the pipe relative to the longitudinal axis of the pipe. The other is the distance the wave must travel between the transmitting transducer and the receiving transducer.

From the foregoing, it can be seen that I have provided a method and apparatus which makes it possible to non-destructively test tubular objects and which is sensitive only to a reflected or flaw signal. I have found that cracks, inclusions, slivers and weld imperfections which are often found in welded pipe all have an irregular non-planar surface which will give a greater reflection than a plane surface, which serves to enhance the sensitivity and reliability of the apparatus.

Where it is only desirable to ascertain whether or not there is a flaw in the pipe without determining its exact location, a continuous wave from the apparatus 18 can be used. However, if it is desirable to determine the location of the flaw as well, a pulsed signal with a time measurement between signal transmission and reception is required as hereinafter explained.

An enlarged detail view of the offsets 14 used in FIGURE 1 is shown in FIGURE 2. As shown, the offset looks somewhat like a deformed triangle. As shown, the offset is provided with two inclined surfaces 36 and 37 which form an angle of approximately 15° with respect to each other. The offset is also provided with an end wall 38 and a face 39. The face 39 is adapted to engage the end wall of the pipe as indicated in FIGURE 1. The wall 37 is provided with a smooth face 41 upon which the transducer 16 is adapted to be mounted. The angle α between a line perpendicular to the face 41 and a line perpendicular to the face 39 determines the angle at which the maximum intensity wave trains are introduced into the end wall of the pipe. The wave trains are not highly collminated but are angularly divergent because it is desired to insonate (irradiate with sound) substantially the entire wall of the pipe. For example, as shown, the angle α can be 35°. However, it should be realized that my invention can be practiced by using an angle from substantially 0° to substantially 90° but most applications can most readily utilize an angle from approximately 15° to 55°. It should be realized in choosing these angles that the helical waves can only increase their length discontinuously, that is, with fixed offsets, they can only go from one complete loop to two complete loops because nothing in between is usable.

A line which is perpendicular to the face 39 is a line which is also parallel to the longitudinal axis of the tubular member 11. A line which is perpendicular to the face 41 is also parallel to the axis of the transducer 16. There should be a proper balance between the signal attenuation and the path swept by the helix. The greater the angle of the helix, the more loops the helix must make in traversing the full length of the pipe and hence the greater the attenuation of the signal introduced into the pipe. However, the greater the angle of the helix, the greater area of the pipe which will be swept by the particular wave train. For example, it is apparent that a helix that makes only one loop in the pipe sweeps less area and sees less potential flaw area than a helix which makes 2 loops or 3 loops in the same length of pipe. Also, because of the desire to limit the number of receive transducers required, it is desirable to use a beam of ultrasonic waves which are relatively angularly widely dispersed. Thus, I have found by utilizing an angle of introduction of 35°, I obtain a relatively good spread of helices between 15° and 55°.

As hereinbefore pointed out, the receive transducer offset 14 is positioned in such a manner that it discriminates between the reflected wave trains and unreflected wave trains. This is made possible because the reflected wave trains travel in a direction or in a hand which is opposite to the direction in which the unreflected wave trains travel. In other words, it can be said that the reflected wave trains travel in a clockwise direction and the unreflected wave trains travel in a counter-clockwise direction as viewed from the left-hand end of the pipe as shown in FIGURE 1. In order to avoid spurious signals from the unreflected wave trains, the offset 14 includes a wave trap between the surfaces 36 and 37 and which form an integral part of the offset. Thus, when an unreflected wave train enters the wave trap, it is reflected back and forth between the surfaces 36 and 37 until it is effectively attenuated. Thus, it can be seen that the receive transducer offset 14 serves as means for providing a high signal to noise ratio and a "go" or "no-go" differentiation between a signal reflected by the flaw and an unreflected signal. The only reflected ultrasonic wave trains which will be detected by the receive transducer 16 are those which arrive at such an angle that they strike the end of the pipe at a point at which the transducer offset 14 is secured to the end of the pipe. For this reason, practically all of the waves which are reflected by the flaw 27 are dissipated in the end of the pipe because their helices intersect the end of the pipe at positions which are circumferentially spaced from the position at which the receive transducer offset 14 is secured to the pipe.

It should be pointed out that the face 39 has been positioned in such a manner with respect to the face 41 that if an unreflected wave enters the offset at any point on the face 39 and strikes the face 36 or 37, this unreflected wave even by mode conversion can never reflect from these surfaces at an angle greater than 90° and for that reason can never excite the transducer 16 to create a spurious flaw signal.

I have found that it is possible to obtain a continuous and adequate reflection of input waves from a flaw for helical angles between 15° and 55° to give a positive indication of a flaw at any place along the length of the pipe. There are, of course, points of optimum or relatively higher intensity depending upon the circumferential position of the transducer offset 14 with respect to the position of the flaw. For that reason, it may be desirable to place one or more additional transducer offsets on the end of the pipe and thereby determine the points of maximum and minimum signal. However, even a minimum signal will give a positive indication of whether or not a flaw is present in the pipe.

As hereinbefore explained, when working with rather large diameter tubular bodies such as 36 inch pipe, it has been found that it is desirable to utilize helical angles of between 15° and 55°. When working with smaller pipes such as 16, 18 and 20 inch pipe, it is desirable to utilize smaller helical angles as, for example, 25°, 15° and 10°.

Figure 3:
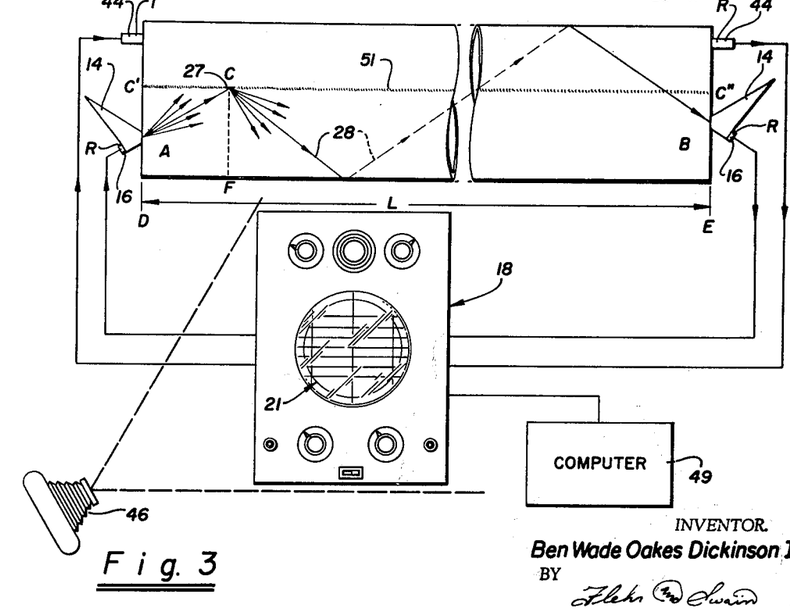
FIGURE 3 is a block diagram with certain parts schematically illustrated incorporating another embodiment of my invention with which it is possible to determine the exact location of flaws in the tubular member.

In FIGURE 3, I have shown apparatus whereby it is possible to ascertain the flaw location as well as to determine whether or not a flaw is present in the tubular body or member. In order to provide flaw location capability for my apparatus, three characteristics of the pipe must be ascertained. They are: the diameter of the pipe, the length of the pipe, and the velocity of the ultrasonic wave train in the pipe. In the case of production testing of line pipe, the diameter can be assumed to be substantially constant. However, the length of each piece of pipe may vary. This length of pipe, assuming constant sound velocity, can be measured directly by through-transmission techniques utilizing a pair of additional transducers 44 which are placed flat against the end walls of the pipe and directly facing each other as shown in FIGURE 3 of the drawings. The transducers 44 are identified as transmit and receive transducers by the letters T and R, respectively, and are mounted on the pipe so as to measure by through-transmission the straight-through or shortest distance path between the ends of the pipe to thereby determine the length of the pipe.

The transducers 44 are connected to the apparatus 18 and the transmit transducer 44 may be supplied with a pulse at the same time that the transmit transducer 16 is supplied with a pulse. A wave train is created in the pipe by the transmit transducer 44 which is propagated along the length of the pipe and directly to the receive transducer 44 at the other end of the pipe and a representation of the time of flight is given on the oscilloscope 21 provided in the apparatus 18. The representation can then be calibrated by actually measuring the length of the pipe so that thereafter the representation on the oscilloscope will give the length of the pipe of that same thickness and for the same frequency of operation.

Although I pointed out that the same pulse could be utilized for exciting the transducer 16 and the transmit transducer 44, it may be desirable to utilize separate pulses from the apparatus 18 so that there is no possibility of confusion in the display on the oscilloscope 21. It should be pointed out that with some combinations of frequency and pipe thickness, various modes of Lamb or other complex waves are generated within the pipe and also that such waves may be reflected internally a number of times in a helical path down the pipe length so that the phase and/or group velocity of the ultrasonic sound train will vary with the pipe thickness. However, for a given pipe thickness, this phase and/or group velocity is constant and through-transmission measurement of the pipe length provides a directly usable calibration standard for each piece of pipe.

Thus, with the transducers 44, it is possible to measure the time of flight for a given helical wave bounced from a flaw such as the flaw 27 to give a direct reading on the oscilloscope 21, or the specific coordinates of the location of the flaw may be developed from the time of flight as hereinafter described. The direct presentation can be an oscilloscope pattern of the time of flight or a set of coordinates may be presented on a suitable display such as a digital voltmeter. These results can be recorded in a suitable manner such as by photographing the display on the oscilloscope 21 by a camera 46 or by recording the information upon magnetic tape for storage and later review or retrieval. A typical oscilloscope pattern is shown in FIGURE 1.

With the pipe length, the diameter of the pipe, the velocity of ultrasonic wave trains in the pipe and the elapsed time between the transmission of a signal from the transmit transducer 16 and the receive transducer 16, the location of the flaw can be calculated directly by hand or by the use of a substantially conventional electronic computer 49 using techniques shown in the following analysis. In this analysis, it has been assumed that the pipe has been longitudinally welded to provide a longitudinal weld as indicated at 51. Now let it be assumed that we have a special case in which the flaw occurs in the weld which is the usual circumstance.

With these assumptions, let also the following be assumed using the designations shown in FIGURE 3.

Let $t$=the measured time of flight which is the time of travel for the wave train emitted by the transmit transducer 16 from point A to its reflection from point C, and its receipt at point B at the receive transducer 16. In other words, $$t = t_1 + t_2$$

where $t_1$=the time required for an ultrasonic wave to travel from A to C, and $t_2$=the time required for the wave to travel from C to B.

L=the length of the pipe and $=X_1+X_2$ where $X_1 = C'C = DF$
$X_2 = CC'' = FE$
$m$=the number of complete or integral helical loops between A and C on wave path
$n$=the number of complete or integral helical loops between C and B on the wave path
$Y_B$=the circumferential distance from the point of contact of the transmit offset 14 to the point of contact of the receiving offset 14
$Y_C$=the circumferential distance from the point of contact of the transmit offset 14 to the flaw C.
$D$=the mean diameter of the pipe wall
$\Delta = Y_C - Y_B$ The length of the pipe L is measured by the calibration method hereinbefore described by measuring the time of flight between the transducers 44 on opposite ends of the pipe. $Y_B$ is a fixed known distance. The measured time of helical flight $t$ of the bounced or reflected wave is used to calculate the distance of helical travel by multiplying L by the ratio of $t$ to the time of flight between the calibration transducers 44.

In a particular embodiment of my invention based upon experimental data, I have found it possible for a given length of pipe to utilize offsets having a selected angular orientation and sensitivity whereby $m$ and $n$ are known. It is normally quite easy to determine the number of loops which occur and to thereby position the transducer offsets in the proper manner.

As pointed out previously, in longitudinally welded pipe, most of the flaws of interest occur in the weld. It is for that reason the dimension $Y_C$ which is the circumferential distance from the point of contact of the transmit offset to the flaw can be easily measured.

Now examining FIGURE 3, with the transducer offsets 14 positioned as shown, we find that $m$=zero and $n$=one. With this information, we can write the following equation for the first triangle.

$$X_1^2 + Y_C^2 = \overline{AC}^2 \qquad (1)$$

because $X_1$ and $Y_C$ are the sides of a right triangle and AC is the hypotenuse of the right triangle. For the second triangle, the equation is:

$$\overline{Y_C - Y_B + \pi D}^2 + X_2^2 = \overline{CB}^2 = \overline{\Delta + \pi D}^2 + X_2^2 \qquad (2)$$

Also, it can be stated that $$AC + CB = h \qquad (3)$$

Also, $$X_1 + X_2 = L \text{ or } X_1 = L - X_2 \qquad (4)$$

Substituting Equartion 3 into Equation 1 and Equation 4 into Equation 1, the following equations are obtained:

$$\overline{L - X_2}^2 + Y_C^2 = \overline{h - CB}^2 \qquad (5)$$

$$\overline{\Delta + \pi D}^2 + X_2^2 = \overline{CB}^2 \qquad (6)$$

Substituting Equation 6 into Equation 5 to eliminate $\overline{CB}$:

$$\overline{L - X_2}^2 + Y_C^2 = \overline{h - \sqrt{X_2^2 + \overline{\Delta + \pi D}^2}}^2 \qquad (7)$$

In Equation 7, L, $Y_C$, $h$, $\Delta$, $\pi$ and D are known which permits solving the equation for $X_2$, the distance of the flaw from the right end of the pipe.

From the foregoing, it can be seen that anyone skilled in the art can program a computer 49 so that it can solve the simple equations to give the coordinates and a direct indication of the position of the flaw in the weld.

Figure 4:
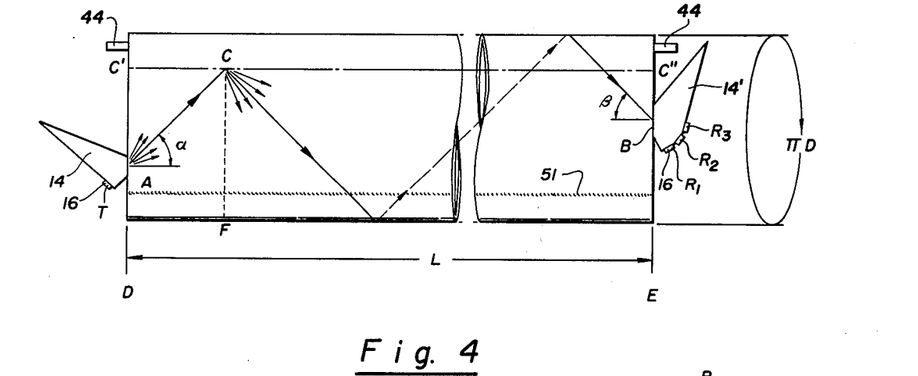
FIGURE 4 is a partial perspective view of another embodiment of my invention utilizing a particular type of transducer offset and a plurality of receiving transducers.

For the general case of flaw orientation, that is, where the flaw may not be in the weld, the determination of the position of the flaw in the pipe requires measurement of the angle at which the wave train is received. To make this determination, let it be assumed that a special receiving offset 14′, as shown in FIGURE 4, is used which has positioned on it at predetermined angles with respect to the longitudinal axis of the tubular member or pipe a plurality of receive transducers 16 which are indicated as R1, R2 and R3. By serially selecting the receive transducer, it is possible to determine which of the transducers receives the maximum signal and thereby to determine rather closely the angle at which the reflected wave train arrives at the offset 14′. Such an offset is advantageous because it also eliminates spurious unbounced or unreflected signals or wave trains which otherwise might interfere with the reflected signals.

In determining the position of the orientation of the flaw C, let:
$$AD = Y_1$$
$$BE = Y_2$$
$$DF = C'C = X_1$$
$$FE = CC'' = X_2$$
$$CF = C'D = C''E = Z$$
$$AC' = C'D - AD = Z - Y_1$$

Figure 5:
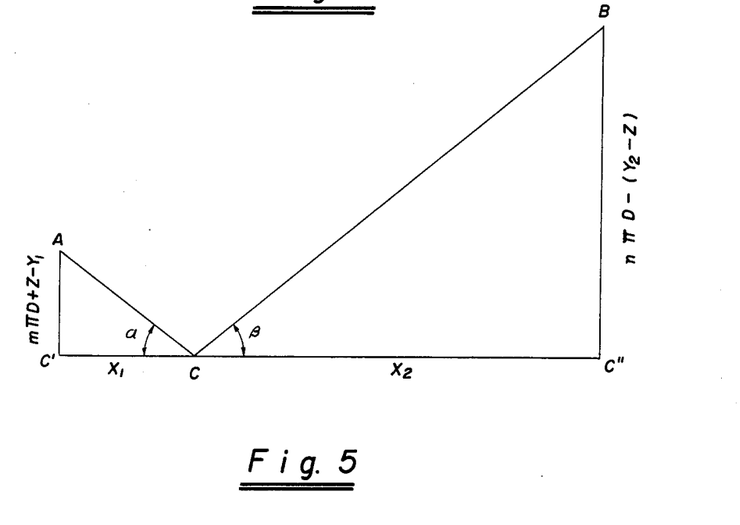
FIGURE 5 is a representation of the double triangles utilized in calculating the position of a flaw located in the tubular member.

These dimensions and angles can be transferred into an equivalent pair of double triangles which are shown in FIGURE 5 formed by "unrolling" the cylindrical surface of the pipe. In this figure, $$h = h_1 + h_2$$

where $h_1 = AC$ and $h_2 = CB$ and $h$ is obtained from the measured time of flight of the bounced wave from A to C to B. From FIGURE 5, it also can be seen that $$L = X_1 + X_2$$

The angle $\beta$ as hereinbefore described (see FIGURE 4) is ascertained by determining which of the receive transducers R1, R2 and R3 receives the strongest signal. The particular angles of the transducers can be previously programmed into the computer 49 to thereby greatly reduce the time required for determining the orientation of the flaw.

With the flaw in the position shown in FIGURE 4, $m=0$ and $n=1$. I have found that in my system when utilizing a transducer offset of a predetermined shape so as to produce a predetermined helical divergence, for any resulting pattern of bounced or reflected wave trains, there is a fixed time span within which wall all bounced signals involving a given total number of complete or integral helical loops. Thus, it can be written that $m+n=k$, where $k$ is a constant. Further, by proper transducer offset design, I can make $m=0$. Therefore, $n=k$.

With the foregoing assumptions, let the following equations be written.

$$\frac{X_1}{h_1} = \cos \alpha \qquad (8)$$

$$\frac{m\pi D + Z - Y_1}{h_1} = \sin \alpha \qquad (9)$$

$$\frac{X_2}{h_2} = \cos \beta \qquad (10)$$

$$\frac{n\pi D - (Y_2 - Z)}{h_2} = \sin \beta \qquad (11)$$

$$X_1 + X_2 = L \qquad (12)$$

$$h_1 + h_2 = h \qquad (13)$$

In these equations, we know that angle $\beta$, the length L, the helical path length $h$, $m$ and $n$, the diameter of the pipe D, $Y_1$ and $Y_2$, and $\sin \beta$.

Therefore, in the six equations, we have six unknowns for which we can solve. First, substituting Equations 8, 12 and 13 into Equation 10, we obtain the following equation:

$$\frac{L - X_1}{h - h_1} = \cos \beta \qquad (14)$$

Then, solving for $h_1$ we find that $$h_1 = (X_1 - L) \sec \beta + h \qquad (15)$$

Then, simplifying Equation 9, we obtain the following equation because $m=0$.

$$\frac{Z - Y_1}{h_1} = \sin \alpha \qquad (16)$$

Then, substituting Equation 15 into Equation 8, we get:

$$X_1 = [(X_1 - L) \sec \beta + h] \cos \alpha = X_1 \cos \alpha \sec \beta - \cos \alpha (L \sec \beta - h)$$

$$X_1 = \frac{\cos \alpha (L \sec \beta - h)}{\cos \alpha \sec \beta - 1} \qquad (17)$$

Then, substituting Equation 15 into simplified Equation 16, we obtain:

$$Z - Y_1 = \sin \alpha [(X_1 - L) \sec \beta + h] = X_1 \sin \alpha \sec \beta - (L \sin \alpha \sec \beta - h \sin \alpha)$$

$$Z - X_1 \sin \alpha \sec \beta = Y_1 - \sin \alpha (L \sec \beta - h)$$

$$X_1 = \frac{Z - Y_1 + \sin \alpha (L \sec \beta - h)}{\sin \alpha \sec \beta} \qquad (18)$$

Substitutnig Equations 14 and 13 into Equation 11, we obtain $$\frac{n\pi D - (Y_2 - Z)}{L - h_1} = \sin \beta = \frac{n\pi D - (Y_2 - Z)}{L - [(X_1 - L) \sec \beta + h]} \qquad (19)$$

Solving the above equation:

$$L \sin \beta - X_1 \sin \beta \sec \beta + L \sin \beta \sec \beta - h \sin \beta = n\pi D - Y_2 + Z$$

$$X_1 = \frac{\sin \beta (L + L \sec \beta - h) - n\pi D + Y_2 - Z}{\tan \beta} \qquad (20)$$

Using Equations 17, 18 and 20, we have three equations having three unknowns $X_1$, $\alpha$ and $Z$ because L, $\beta$, $h$, $Y_1$ and $Y_2$ are known. These can be readily solved in a conventional manner to provide the values for $X_1$ and $Z$ which are the flaw coordinates.

From the foregoing calculations, it can be seen that the path of the wave train from A to C and the path of the wave train from C to B has been represented as the hypotenuses of two separate triangles. The sum of the hypotenuses of these two right triangles corresponds to the time of flight $t$ of the helical transmission signal from A to B via C. The length of the pipe is measured by the calibration transducers 44 from the time of flight for the transmission signal, and is represented by the sum of the bases of the two right triangles.

In the first case given in which the flaw was assumed to be in the weld, the distance from a line parallel to the longitudinal axis of the pipe through point A circumferentially to the point C can be readily determined. With this information, it is possible to establish two right triangles wherein the sum of the two hypotenuses and the sum of the two bases are known, and we wish to solve for the leg of one triangle knowing the leg of the other triangle but not knowing the angle. This, as pointed out above, gives us two equations and two unknowns which can be simplified to solve for both unknowns.

In the second example, where it was assumed that the flaw was not necessarily located in the weld, it is necessary to determine the angle at which the reflected wave arrives at the receive transducer. Since the angle of the received helix, the sum of the hypotenuses and the sum of one side of each of the triangles is known, it is possible to calculate both the circumferential and longitudinal location of the flaw as explained above.

Figures 6, 7:
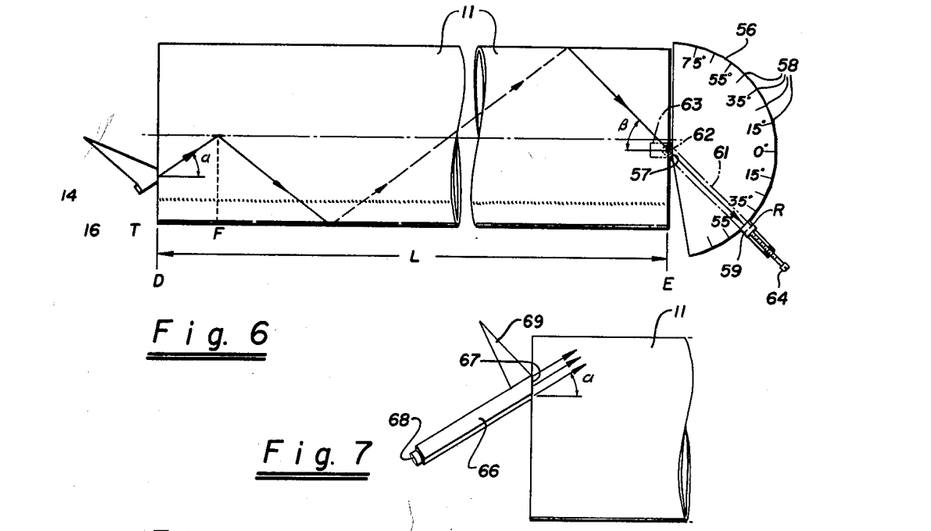
FIGURE 6 is a partial view showing another embodiment of my invention utilizing an ultrasonic protractor as a part of the means for receiving a reflected wave train.
FIGURE 7 is a partial perspective view of another embodiment of my invention utilizing a particular type of offset member for introducing ultrasonic wave trains into the tubular member.

In place of the offset 14', an ultrasonic protractor 56 can be used which is shown in FIGURE 6. This protractor consists of a large piece of a suitable flawless material such as steel plate which is substantially in the form of a semi-circle. The protractor 56 is provided with a relatively small smooth surface 57 which engages the end of the pipe 11, as shown in the drawing. The ultrasonic protractor 56 is held in position in engagement with the pipe by suitable means such as welding it to the pipe. It also can be fastened to the pipe by means similar to the means utilized for holding the offsets 14 in place as hereinafter described. The circumference or outer surface of the ultrasonic protractor is provided with a plurality of precisely located flat surfaces 58 which are positioned on the protractor at accurately predetermined angles. These surfaces 58 are marked with the angle at which the ultrasonic waves are received from or introduced into the pipe 11 with respect to the longitudinal axis of the pipe 11 as hereinafter described. Alternatively, the outer surface of the ultrasonic protractor may be made accurately cylindrical and the transducer may be coupled to the protractor at any angle by a close fitting sliding shoe which cooperatively engages the surface of the protractor.

A transducer 59 is adapted to be positioned on the flat surfaces 58 on the circumference of the ultrasonic protractor. The transducer is held in the desired location by U-shaped clamping member 61 which is pivotally mounted at 62 on brackets 63 affixed to the protractor. It will be noted that the pivot point 62 for the U-shaped bracket 61 is at the point at which the ultrasonic protractor engages the end of the pipe 11. A screw 64 is threaded into the end of the U-shaped bracket 63 and engages the transducer 59 to hold it in the desired position.

It can be readily seen that the transducer 59 can be positioned at any desired angle on the ultrasonic protractor 56 so that the ultrasonic wave train is introduced into the ultrasonic protractor at a predetermined angle. Because of the relatively narrow portion of the ultrasonic protractor which is in engagement with the end of the pipe 11, a beam is introduced into the pipe 11 which is accurately collimated at a fixed helical angle. In the same way, an ultrasonic wave train travelling in the pipe can only be received at the point at which the ultrasonic protractor engages the pipe. For that reason, it is possible to determine accurately the angle at which the wave train enters the ultrasonic protractor from the pipe by positioning the transducer 59 until the position of the transducer 59 is such that it receives a maximum reflected signal. The helix angle of the reflected wave can then be readily determined merely by reading the protractor 56.

Thus, it can be seen that the ultrasonic protractor is very useful in introducing a wave train into the pipe at a predetermined angle or for accurately determining the angle at which the wave train is received from the cylindrical member or pipe 11.

It should be pointed out that in using the ultrasonic protractor, it is necessary to be sure to eliminate any spurious signals which may occur from an unbounced or unreflected helical wave train. An unbounced helical wave train could give a false flaw signal indication. These unbounced signals can be readily determined by the fact that they result from a wave train travelling from the transmit transducer through the pipe in an unbounced helical wave path to enter the ultrasonic protractor at face 57, proceed to the equivalent, but opposite hand, angularly placed face (56) of the ultrasonic protractor, reflecting therefrom back to face 57, again reflecting to give a signal at R. The false flaw indications can be determined because they occur at a distance equal to the equivalent unbounced helical wave plus twice the radius of the ultrasonic protractor.

Additional means may be provided for introducing ultrasonic wave trains into the pipe 11 at a desired angle and at the same time to provide a highly collimated beam. Also, similar means can be utilized for receiving an ultrasonic wave train at a predetermined angle. Thus, as shown in FIGURE 7, it can consist of an elongate flawless member 66 of a suitable cross-section such as rectangular which is provided with a relatively small surface 67 in engagement with the end of the pipe 11. If desired, the member 66 can be provided with a triangular portion 69, as shown, which serves as a wave trap to attenuate undesired wave trains in the manner hereinbefore described. As with the previous devices, the member 66 can be affixed to the pipe 11 in any suitable manner such as by welding or by straps. A transmit transducer 68 is secured to the end of the member 66 and is adapted to introduce ultrasonic wave trains into the member which, in turn, introduces the wave trains into the pipe 11 at the desired angle indicated by the angle $\alpha$, and at the same time to provide a highly collimated beam.

If desired, other means may be provided for introducing the ultrasonic wave trains into the cylindrical members at a predetermined angle or for determining the angle at which helical wave trains will be received from the pipe 11. For example, a plurality of transducer offsets can be utilized and the received angle $\beta$ can be measured by means of biaxial probes or transducers provided at each offset. Such biaxial probes are disclosed in an article entitled "A Method for Analyzing Surface Vibration at a Point" by J. S. Arnold and J. G. Martner published in the Review of Scientific Instruments, vol. 29, page 779 on September 1958. As is well known to those skilled in the art, such biaxial probes measure vibrational amplitude or acceleration in two perpendicular directions in a plane tangent to the surface of the pipe and thus provided a direct measure of the direction of the ultrasonic wave train.

For a predetermined transmitted wave angle $\alpha$ and predetermined positions of A and B, the maximum number of helical loops $m'$ possible for any unbounced wave train equals $$\frac{L}{\pi D \cot \alpha}$$

Similarly, the maximum number of helical loops possible for the bounced wave $$n' = \frac{L}{\pi D \cot \beta}$$

$m+n$ are greater than or equal to $m'$ or $n'$ depending upon which is greater. For a conventional length of pipe as, for example, 40 ft. for 36 inch diameter pipe, for any placement of the transducer offsets 14 and with $\alpha=35°$, the most overall effective angle for this particular situation, and with $\beta$ equal to 35°, one of the first usable reflected signals which I have found to be associated with $k=2$ involves the following combinations of $m$ and $n$.

$$m=0, n=2; m=1, n=1; m=2, n=0$$

As explained previously, I have found it possible to obtain satisfactory results in testing line pipe approximately 40 ft. in length of different diameters and different wall thicknesses with the angle of the helices of the wave trains in the pipe ranging from 15° to 55°. Similarly, I have found that, for example with 40 ft. lengths of 36 inch diameter, .50 inch wall line pipe, the best test frequency of ultrasonic wave trains is 2.25 mc. by evaluating various frequencies in the range of 0.4 mc. to 10 mc.

By way of example, with a piece of line pipe 40 ft. in length and having a 36 inch outside diameter and a wall thickness of 0.50 of an inch, I have found that a helical wave train having an angle of 35° with respect to the longitudinal pipe axis operated very satisfactorily. This choice of the angle of the wave train is determined by balancing the following factors. Of particular importance is the angle of incidence of the wave train to a flaw. Another factor is size, shape, orientation and surface character of the reflecting surface presented to the incident helical wave. As is readily apparent, the larger the incident angle, the greater is the effective reflecting area of a flaw and for that reason the greater is the reflected signal from the flaw. Another factor is the length of the path of travel of the reflected wave and its attenuation thereby. The lesser the helical angle, the lesser the number of helical loops required for travel of the wave train from the transmitting transducer to the flaw and, in turn, for travel of the reflected wave from the flaw to the receiving transducer, and for that reason, the smaller the attenuation of the reflected signal which is indicative of a flaw. Another factor dependent upon incident angle is the degree of mode conversion and resultant amplitude of the reflected waves of the desired modes. The final factor is the number of helical loops required to assure adequate angular dispersion of the transmitted ultrasonic wave train so as to ensure complete coverage of or passage through all of the pipe wall and/or longitudinal weld.

Although there are no definite cutoffs of the ultrasonic wave train as a function of frequency, I have found that it is desirable to utilize a frequency of one megacycle for wall thicknesses which are greater than 0.50 and less than 0.25 in thickness, and a frequency of 2.25 megacycles where the thickness is greater than 0.25 and less than 0.50 of an inch.

As shown in FIGURE 1, when a flaw is detected, there is normally more than one presentation upon the oscilloscope 21. For example, as shown in FIGURE 1, using offsets which are designed to place the transducer axis at an angle of 35° with respect to the pipe longitudinal axis, the flaw signal can consist of a plurality of pulses such as the pulses 71, 72 and 73. Each of the pulses is separated by a space which represents an additional integral helical loop. Thus, the first signal 71 represents one helical loop of the reflected wave from the flaw to the receiving transducer, whereas the second signal 72 indicates two helical loops from a flaw to the receiving transducer and signal 73 represents three helical loops from the flaw to the transducer. It also will be noted that the signals can be distinguished one from the other because for example the 35° offset creates a wave train which is angularly oriented to provide a maximum signal for two and three loop helical modes.

Figure 8:
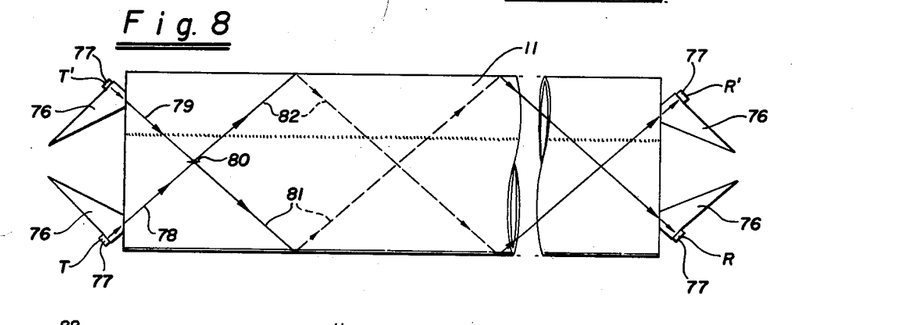
FIGURE 8 is a perspective view of another embodiment of my apparatus in which redundancy arising from multiple channels is utilized to check the accuracy of the results.

If it is desirable to provide coincidence checking means to ensure that all flaws are detected and also to ensure that no errors occur, apparatus such as that shown in FIGURE 8 can be provided. Such means consists of at least one additional set of transmit and receive offsets 76 and transmit and receive transducers 77 mounted on opposite ends of the pipe 11. Thus, as shown in FIGURE 8, a pair of offsets 76 and transducers 77 have been mounted on one end of the pipe and a similar pair have been mounted on the other end of the pipe. The offsets 76 are arranged in such a manner that the ultrasonic wave trains are introduced in opposite ends of the pipe. Thus, the lowermost offset 76 introduces a wave train 78 which travels around the pipe in a counter-clockwise direction as viewed from the left-hand end of the pipe and the other offset 76 introduces a wave train 79 into the pipe which travels or rotates in a clockwise direction as viewed from the left-hand end of the pipe as shown in FIGURE 8.

Assuming that there is a flaw in the pipe at 80, the wave train 78 is reflected to provide a reflected wave train 81 and the wave train 79 is reflected to provide a bounced or reflected wave train 82. The reflected wave trains 81 and 82 travel down the pipe in a manner similar to that hereinbefore described in opposite hand orientations until they are received by the receive transducer 77, provided on the opposite end of the pipe. These two reflected signals 81 and 82 are reflected from opposite sides of the flaw and, therefore, may have substantially different characteristics. However, the time of flight of both of the signals should be substantially identical and, therefore, there is coincidence in time which would be indicated on the indicating apparatus utilized with the system as shown in FIGURE 8 and which would be similar to that utilized in the embodiments hereinbefore described.

The reflected wave trains would arrive at the receive transducers R and R' at coincidence in time only if the transducers are spaced symmetrically about the flaw 80. Assuming there is coincidence, it may be desirable to avoid this coincidence on the display apparatus in order to be able to distinguish spurious radiation. Therefore, it may be desirable to present the pulses on the transmitting transducers T and T' sequentially in time and then viewing both reflected signals in the display apparatus which would be spaced in time by the same interval at which they were spaced in time when they were introduced. This makes possible a much surer way of checking coincidence rather than having the pulses superimposed one on top of the other and also makes it easier to ascertain spurious radiation.

If it is desired not to delay one transmit pulse behind the other, the receive transducer R' can be used as the transmit transducer T' and the pulses introduced at opposite ends of the pipe and simultaneously pulsed. If there is a flaw, then both the receivers R and R' which are on opposite ends of the pipe would give a flaw indication which could be compared in real time without the possibility of spurious flaw indication from unbounced wave trains.

It is readily apparent from the foregoing that as many channels as desired may be utilized to provide the desired amount of redundancy to ensure that an actual flaw is being detected rather than a spurious signal being received.

As explained above, it is assumed that the transducers are spaced symmetrically about the longitudinal axis passing through the flaw 80. If such is not the case, the coincidence must be determined by a simple computer which would compute from the time of flight of each wave train received the circumferential and longitudinal cooridnates of the flaw in the pipe and compare these with the flaw coordinates computed from the other wave trains received to determine whether or not there is coincidence.

The foregoing discussion of the operation of the system shown in FIGURE 8 has been with the assumption that the flaw in the pipe is generally substantially parallel to the longitudinal axis of the pipe. If the flaw orientation is such so that it is substantially perpendicular to the longitudinal axis of the pipe, it is not possible to have a reflected through transmission signal from the flaw which passes longitudinally through the pipe from one end to the other. If it is anticipated that there might be such a perpendicular flaw in the pipe, a check should be made with apparatus of the type shown in FIGURE 9. This is a type of system which would also normally be used for the inspection of girth welds in pipes such as would occur where two pipes have been welded together.

Figure 9:
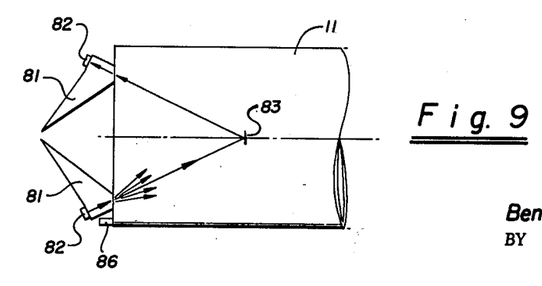
FIGURE 9 is a partial front elevational view of another embodiment of my apparatus utilized for checking girth welds or flaws perpendicular to the longitudinal axis of the tubular member.

In such apparatus, the transmitting and receiving offsets 81 are located on the same end of the pipe rather than on opposite ends and the transmitting and receive transducers are mounted on the offsets. The transmitting transducer T serves to introduce an angularly widely dispersed beam of ultrasonic helical waves as indicated. One of these waves is reflected by the perpendicular flaw indicated at 83. One ray of the angularly reflected beam will be received by the receive transducer R. The principle of operation is substantially identical to that hereinbefore described. The waves are introduced in a helical path and are reflected in a helical path. A pair of right triangles are formed which have a common leg. The hypotenuses are formed by the path of the wave trains as shown, whereas the common leg is the unknown distance determining the axial location of the flaw. This distance can be readily determined by solving the equations representing the triangles in much the same manner as hereinbefore described since the time of flight of the wave trains and the angles of introduction and receipt are known. The latter could be determined by use of transducer offsets such as 14' in FIGURE 4. If the axial distance to a potential flaw is known, as would be the case with a girth weld inspection, the angles of transmission and reception need not be known in order to calculate the circumferential location of a flaw in the girth weld.

In the apparatus shown in FIGURE 9, continuous waves can be utilized instead of pulses if it is not necessary to determine the flaw location but only to determine the presence of a flaw. For long pipes, the waves reflected from the wall will be attenuated below flaw-reflection amplitude.

Another method and apparatus for detecting perpendicular flaws of the type shown in FIGURE 9 can consist of a transducer 86 which is secured to the end of the pipe. Transducer 86, which can be similar to the calibrating transducers 44 shown in FIGURE 3, introduces angularly widespread ultrasonic wave trains into the end of the pipe which also will reflect from the flaw 83 and these can be picked up by the same transducer 86 with it first operating as a transmit transducer and then as a receive transducer, or by a separate receive transducer (not shown). Because of the relatively wide spread of the helical wave trains introduced by the transducer 86, a very limited number of the transducers 86 is required to check a girth weld completely. However, when the girth welds are checked in this manner, it should be appreciated that helical waves are again being utilized. It is only when the flaw is immediately opposite the transducer 86 in a line parallel to the longitudinal axis of the pipe that helical waves are not utilized for detecting the flaw.

To provide a minimum flaw size rejection level, a given minimum signal strength from the bounced or reflected wave may be established. Because of the loss of energy and by scattering at the point of reflection or bounce, signal strength from a given flaw orientation very generally is inversely proportional to the axial distance along the pipe from the receiving transducer. For that reason, the selected minimum reflection signal level is not constant for all flaw locations. Nevertheless, it is possible to select a suitable signal level which will provide a combination of adequate sensitivity for flaws near the transmitting transducers and yet not create inordinate rejection problems. If more accurate or uniform minimum flaw rejection level is desired, the flaw location may be calculated and a preselected curve of sensitivity of flaw indication versus location in the pipe can be used to provide a uniform flaw size rejection level. If desired, pulses can be transmitted from both ends so that the range of the reflected signal strength as between a flaw close to the receiving transducer and in the middle of the pipe is much less than is the signal strength variation from one end of the pipe to the other using transmission from one end only.

Thus, with a predetermined signal strength, suitable circuitry can be used which is well known to those skilled in the art which has a certain threshold level which, when a signal rises above the threshold level, will trip a relay or other indicating device. If another flaw detecting channel is provided to ensure accuracy and a pulse is again received which is above the threshold level, it also can be utilized to trip the relay of the signalling device to indicate that both channels have received a signal which is above the threshold level. This, in turn, will give an additional check on whether a flaw is present in the pipe and can be utilized for lighting a signal light or operating other suitable flaw alarm or indicating devices.

From the foregoing, it can be seen that in addition to providing additional channels to give the desired redundancy, another check can also be made so that the signal level is above a predetermined threshold level to eliminate possible false signals or rejection signals from flaws within an acceptable size range.

Figure 10:
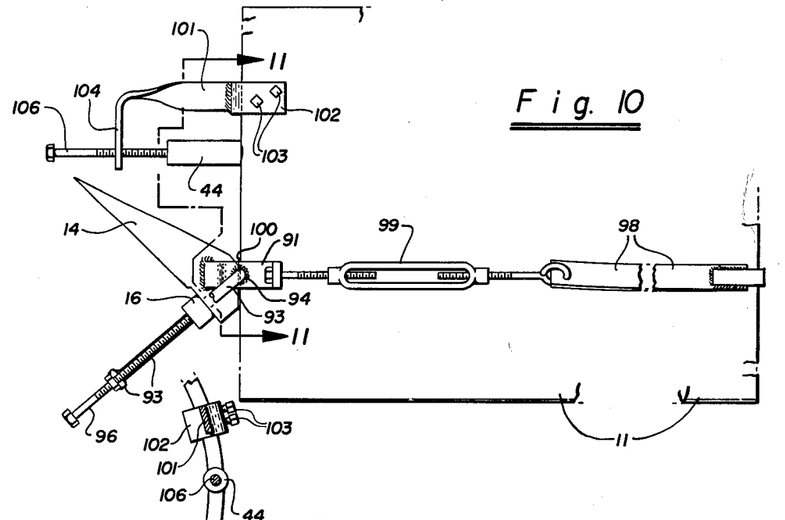
FIGURE 10 is an enlarged detail view showing means utilized for securing the offsets to the tubular members.
Figures 11, 12:
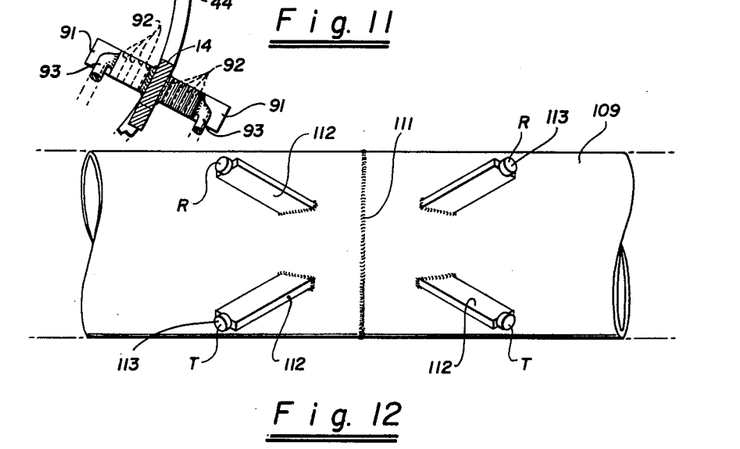
FIGURE 11 is a cross-sectional view taken along the line 11—11 of FIGURE 10.
FIGURE 12 is another embodiment of my apparatus utilized for testing on-stream piping.

As hereinbefore explained, the offsets and transducers, ultrasonic protractors and the like can be secured to the ends of the pipe or the cylindrical member in any suitable manner. For example, as shown in FIGURES 10 and 11, the offsets 14 can be provided with a pair of L-shaped brackets 91 which are secured to the sides of the offset 14 but spaced therefrom by spacers 92. Spacers 92 can be inserted or removed to accommodate different wall thicknesses. A U-shaped member 93 is fixed on the brackets 91 at 94. It is provided with a threaded rod 96 which is adapted to be threaded downwardly into engagement with the transducer 16 to hold the transducer 16 in firm engagement with the offset 14.

Means is provided outside and inside of the pipe for engaging the brackets 91 to hold the offsets 14 in engagement with the ends of the pipe and consists of metal straps 98 which extend longitudinally of the pipe and which are secured to the offsets 14 on both ends of the pipe as shown in FIGURE 10. Each end of each strap 98 is secured to one end of a turn buckle 99 and the other end of the turn buckle is secured to the bracket 91.

In order to secure adequate coupling between the offset 14 and the end of the pipe, it may be desirable to provide a shim 100 of a suitable relatively soft material such as a small sheet of aluminum, copper or lead. The purpose of utilizing such soft material is to make it possible to obtain a good sound transmitting contact between the offset 14 and the end of the pipe. As hereinbefore explained, it is, however, possible to obtain adequate contact with the end wall of the pipe without utilizing such a shim material. Another means of assuring uniform contact between the offset and the end of the pipe to preclude the necessity of pulse-height calibration or adjustment is to use a hardened offset. This hardened offset is actually driven or pressed into the end wall of the pipe. If it is desired to provide a calibration for degree or completeness of contact of the offsets to the pipe, the pulse height of a signal from the calibration transducer 44, shown in FIGURE 10, can be received by a transducer placed upon the offset on the opposite end of the pipe. Since the direct placement of the calibration transducer 44 is uniformly good, the pulse height of the first received signal at the receiving transducer on the offset is a direct selective measure of the contact effectiveness between that offset and the end of the pipe. This procedure can be alternatively applied to both ends of the pipe. An alternate contact calibration device is to place an additional offset and transducer on each end of the pipe. This additional offset should be oriented to transmit an unbounced helical signal. These unbounced helical signals can then be directly used to evaluate and calibrate the contact effectiveness of the offsets either directly or through a computer.

Also, if desired, certain lubricants can be utilized to help achieve this intimate contact between the offset 14 and the pipe 11. For example, ordinary lubricating grease has been found to be suitable for such a purpose.

It should be pointed out that although we have assumed that a flat surface is provided on the end of the pipe, it is possible to utilize the same type of offset when the pipe is provided with a beveled end surface. When such is the case, it is only necessary to provide a complementary bevelled end surface on the offset 14. It has been found that these bevelled end surfaces do not interfere with the transmission of the ultrasonic sound wave trains between the offset 14 and the wall of the pipe 11. As well, if the offset is pressed into the end of the pipe, very rough or rusty surfaces may be used without additional preparation.

The ultrasonic protractor 56 which is shown in FIGURE 6 can also be secured to the end of the pipe 11 in a manner similar to that shown in FIGURE 10 by the use of the straps 98 and turn buckles 99.

As shown in FIGURE 10, the transducers 44 can be secured to the end of the pipe by a bracket 101 which has a U-shaped end portion 102 adapted to receive the end of the pipe. A set screw 103 is provided in the end portion to clamp the bracket to the pipe. The bracket 101 is formed to provide a portion 104 which is parallel to a plane passing through the end of the pipe. A screw 106 is threaded into the portion 104 and is adapted to engage the transducer 44 to hold it in place against the end of the pipe.

As shown in FIGURE 12, it is also possible to utilize my method and apparatus for the inspection of already installed tubular members such as found in a piping system in which the ends of the pipe are solidly welded together as indicated by the weld at 111. To make such inspection possible, offsets or bosses 112 are affixed to the outer side walls of the pipe by suitable means such as welding. The offsets 112, as shown, are arranged symmetrically in pairs on opposite sides of the girth weld 111 and are oriented in such a manner that they will introduce ultrasonic wave trains into helical paths into the pipe 109 towards the girth weld 111 from the transducers 113 which are mounted on the ends of the offsets. These offsets 112 are similar to the elongated member 66 provided in FIGURE 7 and introduce a collimated wave train into the wall of the pipe 109 on back. The signals received on the receive transducers will indicate flaws in the pipe wall, the longitudinal and girth welds in a manner similar to that hereinbefore described.

Similar sets of offsets or bosses are attached on both sides of all girths welds or at any other suitable place in a piping system. The test procedure utilizes every fourth pair of offsets which, in turn, face each other to inspect longitudinally all of the pipe between every fourth pair of these offsets. The girth welds are inspected by using adjacent pairs of offsets as shown in FIGURE 12. Also, as shown in FIGURE 12, the offsets or bosses are arranged to create opposite hand helical wave trains to provide test redundancy and reliability as previously discussed for offsets placed upon the ends of pipe not welded into a piping system. In all respects, the test procedure with offsets or bosses welded to the side of an installed pipe are similar to those previously described for an uninstalled pipe.

It is readily apparent that the apparatus shown in FIGURE 12 is particularly adaptable for on-stream inspection. For example, it is particularly useful for continuous or periodic testing of on-stream process vessels and piping in power, chemical, refinery and industrial plants. The apparatus shown in FIGURE 12 has one additional distinct advantage for on-stream testing which involves piping or cylindrical vessels which operate at relatively high temperatures. As is well known to those skilled in the art, ultrasonic transducers are generally quite sensitive to temperature and cannot be used at high temperatures. By the use of the elongate bosses 112 which extend through the insulation on insulated pipe, a long fin is provided which in effect thermally insulates the transducer from the hot pipes or vessels so that it is possible to operate the ultrasonic transducer at the end of the offset 112 at a temperature which is substantially less than the temperature of the hot piping.

The system shown in FIGURE 12 is particularly adaptable for applications in which it is desirable to periodically test piping and vessels such as in nuclear plants. Thus, at the time when the equipment is originally installed, a permanent record can be made on film or on magnetic tape to record the conditions existing in the piping or vessels at that time. Periodically thereafter, the same system with the same operating characteristics and with the same signal inputs is used for testing the installed equipment. The resulting system responses are recorded and checked or compared with the original records made. If significant differences are observed, these differences serve as an indicator of change which should be investigated. On the other hand, if no differences are observed, it is reasonable to presume that the piping system has remained unchanged. Thus, it can be seen that I have made feasible ultrasonic inspection which makes possible comparison with the initial installed conditions to thereby provide "go" "no-go" inspection of operating or installed piping or other tubular objects or members.

By way of example, with one embodiment of my invention, I have found that it is consistently possible to find and accurately locate flaws smaller than a crack one-half inch in length by ⅛ inch in width oriented in the axial direction in a 40 ft. long piece of large diameter longitudinally welded carbon steel pipe. Although it is easier to detect flaws near the ends of the tubular member, it is possible to find and locate previously unknown flaws such as those smaller than one-half inch in the center of a 40 ft. carbon steel line pipe.

As far as I am able to determine, there is no indication of a limitation of application of my invention for tubular members which is a function of the diameter or thickness of the wall of the tubular members. The length of the tubular member that can be tested is merely a function of the gain available from the receiver and also the strength of the signal which is applied to the transmitting transducers.

An alternate method of determining flaw location in a longitudinal weld of a tubular body is to use an arrangement such as shown in FIGURE 4 wherein the transducer offset 14 insonates substantially the entire wall and longitudinal weld 51 of the tubular body or pipe. By using a receiving offset 14' having several receiving transducers ($16$–$R_1$, $R_2$, $R_3$), each of the receiving transducers will sense the wave trains reflected from flaws in a predetermined range within the longitudinal weld. This predetermined range wherein a particular receiving transducer senses a reflected flaw signal is established by two factors. The first is the angle at which the receive transducer ($16$–$R_1$ or $R_2$ or $R_3$) is placed with respect to the longitudinal axis of the pipe. The other is the degree of collimation or degree of dispersion of the receivable wave trains which a particular receiving transducer will sense. This collimation results from the shape of the receiving offset and the length of its contact surface with the end of the pipe. This method eliminates the necessity to measure wave train time of flight in order to fix the flaw location by placing any signal from a flaw in a preselected area of the pipe on a different receive channel such as $R_1$, $R_2$, or $R_3$ in FIGURE 4. This procedure simplifies flaw signal rejection level selection because a narrower range of flaw signal amplitude variation occurs within the narrow preselected range of pipe wherein each receive channel is geometrically oriented and sensitive. This embodiment permits the location of a flaw without the use of pulses transmit signals since flaw location is not derived from a time measurement. As well, continuous wave or pulsed power supply for the transmit transducer can be separated from and need not be synchronized with the receiver-amplifier connected to the receive transducer. The device for indication of both flaw existence and location can therefore be a suitable voltage measuring device such as an electronic voltmeter or oscilloscope. The result of this system is a great simplification of the transmitting, receiving and display equipments.

It is apparent from the foregoing that I have provided a new and improved method and apparatus for ultrasonic testing and particularly for the ultrasonic testing of cylindrical objects by the generation and use of helical wave trains.

While I have described my invention by means of specific examples and in specific embodiments and methods, I do not wish to be limited thereto. Obvious modifications will occur to those skilled in the art without departing from the spirit of the invention or the scope of the claims appended hereto.

I claim:
1. In a method for the non-destructive testing of tubular objects to determine the existence and location of flaws in the tubular object, introducing an ultrasonic wave train into the wall of the tubular object at an angle to the longitudinal axis and a transverse plane of the tubular object so that the wave train travels in a helical path in the wall of the tubular object, a portion of the ultrasonic wave train introduced into the wall of the tubular object being reflected by the flaw in the tubular object to provide a reflected ultrasonic wave train travelling in the object in a direction or hand which is opposite to the direction of travel of the introduced ultrasonic wave train, scanning the tubular object at a position spaced from the position in which the ultrasonic wave train is introduced into the tubular object until a reflected helical wave train is received, absorbing any unreflected wave trains being received in the vicinity of the reflected wave train, receiving only reflected helical wave trains, and determining the angle at which the reflected wave train is a maximum.

2. A method as in claim 1 together with the steps of determining the length of the tubular object, determining the length of the path travelled by the ultrasonic wave train until it strikes the flaw and the length of the path travelled by the wave train reflected by the flaw until it is received, the length of the tubular object forming the bases of two right triangles and the path of travel of the ultrasonic wave train forming the hypotenuses of the pair of right triangles, and using the angle of the received wave train to determine the circumferential and longitudinal location of the flaw.

3. In a method for the non-destructive testing of a tubular object for determining the existence and location of flaws in a weld extending longitudinally of the tubular object, introducing an ultrasonic wave train into the wall of the tubular object at an angle to the longitudinal axis and a transverse plane of the tubular object so that the wave train travels in a helical path in the wall of the tubular object, a portion of the ultrasonic wave train being reflected by the flaw in the tubular object to provide a reflected wave train in the object travelling in a direction or hand which is opposite to the direction of travel of the ultrasonic wave train introduced into the tubular object, receiving a reflected helical wave train from the tubular object at a position spaced from the position in which the ultrasonic wave train is introduced into the tubular object, substantially absorbing any unreflected wave trains received in the vicinity of the reflected wave trains at substantially the same time that the reflected wave trains are received so that only the reflected helical wave train is received, and determining the length of the tubular object to provide the bases of two right triangles, determining the length of path of travel of the introduced ultrasonic wave train to the flaw and the reflected wave train from the flaw until it is received to determine the hypotenuses of the two right triangles, determining the circumferential distance from the point at which the ultrasonic wave train is introduced into the longitudinal weld, and solving to determine the length of one leg of one of the triangles, and solving for the other leg of the other triangle to determine the distance of the flaw from the end of the tubular object.

4. In a method for the non-destructive testing of tubular members to determine the existence of a flaw in the tubular member, introducing an ultrasonic wave train into the tubular member in a relatively small area of the tubular member at an angle to the longitudinal axis and a transverse plane of the tubular member so that the wave train travels in a helical path in one direction in the wall of the tubular member, introducing an additional ultrasonic wave train into the tubular member at any angle to the longitudinal axis and a transverse plane of the tubular member so that the wave train travels in a helical path in the wall of the tubular member in a direction or hand opposite the direction in which the first named ultrasonic wave train travels in the tubular member, the introduced ultrasonic wave trains travelling in opposite helical directions in the tubular member and being reflected by a flaw in the tubular member to provide first and second reflected wave trains travelling in the wall of the tubular member in directions opposite in hand to the directions in which the wave trains were introduced into the tubular object, receiving the first reflected wave train at a position spaced from the position in which the ultrasonic wave trains are introduced into the tubular member, receiving the second reflected wave train at a position spaced from the position in which the ultrasonic wave trains are introduced into the tubular member, absorbing any unreflected wave trains being received in the vicinity of the first and second reflected wave trains so that only the first and second reflected wave trains are received, and determining whether the reflected wave trains were reflected by the same flaw in the tubular member by using the time of arrival of the first and second reflected wave trains.

5. A method as in claim 4 wherein the first and second received reflected wave trains are spaced apart at predetermined intervals of time and wherein the wave trains introduced into the object are also spaced in time by a similar time interval.

6. In apparatus for use in the non-destructive testing of a tubular object to determine the existence or location of flaws in the tubular object, means for introducing an ultrasonic wave train into the tubular object at an angle to a longitudinal axis and a transverse plane of the tubular object so that the ultrasonic wave train travels in a helical path in the wall of the tubular object, a portion of the ultrasonic wave train introduced into the tubular object being reflected by a flaw in the tubular object to provide a reflected ultrasonic wave train in the object travelling in a direction or hand which is opposite to the direction of travel of the ultrasonic wave train introduced into the tubular object, means for receiving the reflected ultrasonic wave train from the object, means for introducing another wave train into the tubular object which travels substantially parallel to the longitudinal axis of the tubular object, means for receiving the other wave train introduced into the tubular object parallel to the longitudinal axis of the tubular object, means for measuring the length of the tubular object by meausring the elapsed time between the introduction and receipt of the other wave train travelling parallel to the longitudinal axis of the tubular member, and computer means connected to the means for introducing the ultrasonic wave train and the other wave train into the tubular object and to the means for receiving the ultrasonic wave train and the other wave train from the tubular object to compute the position of flaws in the tubular object.

References Cited by the Examiner

UNITED STATES PATENTS

| | | | |
|---|---|---|---|
| 2,612,772 | 10/52 | McConnell | 73—67.5 |
| 2,799,157 | 7/57 | Pohlman | 73—67.7 |
| 2,940,305 | 6/60 | Williams et al. | 73—67.8 |

FOREIGN PATENTS 765,906    1/57    Great Britain.

OTHER REFERENCES

Carlin: Ultrasonics, McGraw-Hill, 2nd edition, 1960, page 80.

RICHARD C. QUEISSER, *Primary Examiner.*